US012457994B2

(12) United States Patent
Mollhagen

(10) Patent No.: US 12,457,994 B2
(45) Date of Patent: Nov. 4, 2025

(54) APPARATUS FOR RESTRAINING THE LOWER LEGS AND FEET OF A LIVESTOCK ANIMAL

(71) Applicant: Jon Davis Mollhagen, Lorraine, KS (US)

(72) Inventor: Jon Davis Mollhagen, Lorraine, KS (US)

(*) Notice: Subject to any disclaimer, the term of this patent is extended or adjusted under 35 U.S.C. 154(b) by 411 days.

(21) Appl. No.: 17/373,436

(22) Filed: Jul. 12, 2021

(65) Prior Publication Data

US 2022/0071174 A1    Mar. 10, 2022

Related U.S. Application Data

(63) Continuation-in-part of application No. 16/104,884, filed on Aug. 18, 2018, now Pat. No. 11,058,096, which is a continuation of application No. 14/879,886, filed on Oct. 9, 2015, now Pat. No. 10,051,840.

(60) Provisional application No. 62/061,990, filed on Oct. 9, 2014.

(51) Int. Cl.
*A01K 15/04* (2006.01)
*A01K 1/06* (2006.01)
*A01K 29/00* (2006.01)
*A61D 3/00* (2006.01)

(52) U.S. Cl.
CPC ............ *A01K 15/04* (2013.01); *A01K 1/0613* (2013.01); *A01K 29/00* (2013.01); *A61D 3/00* (2013.01); *A61D 2003/006* (2013.01)

(58) Field of Classification Search
CPC ...... A01K 15/04; A01K 1/0613; A01K 29/00; A61D 3/00; A61D 2003/006

USPC .......................................................... 119/752
See application file for complete search history.

(56) References Cited

U.S. PATENT DOCUMENTS

| | | | | |
|---|---|---|---|---|
| 3,683,864 A | * | 8/1972 | Priefert | A61D 3/00 119/737 |
| 5,129,362 A | * | 7/1992 | Ferrell | A61D 3/00 119/843 |
| 6,470,831 B1 | * | 10/2002 | Taylor | A01K 1/0613 119/751 |
| 7,832,363 B1 | * | 11/2010 | Mollhagen | A01K 1/0613 119/507 |
| 2011/0079184 A1 | * | 4/2011 | Mollhagen | A61D 3/00 119/752 |

FOREIGN PATENT DOCUMENTS

WO    WO-0158270 A1 * 8/2001 ............ A01K 15/00

* cited by examiner

*Primary Examiner* — Peter M Poon
*Assistant Examiner* — Sahar Almatrahi
(74) *Attorney, Agent, or Firm* — Robert O. Blinn

(57) ABSTRACT

A livestock animal leg restraining apparatus includes a chute having a floor and sidewalls, a center pad assembly and two side pad assemblies. The center pad assembly is mounted in a raised position above the center of the floor of the chute. The center pad assembly presents two opposite center pads that are oriented in the outboard direction. Two side pad assemblies are mounted to pivot panels that are able to pivot out from the sidewalls of the chute from an open position to a closed position. Each side pad assembly presents a side pad that is oriented in an inboard direction. When the pivot panels are tilted to the closed position, the side pads are brought into close proximity with the center pads so as to restrain the lower legs of a livestock animal.

1 Claim, 17 Drawing Sheets

APPARATUS FOR RESTRAINING THE LOWER LEGS AND FEET OF A LIVESTOCK ANIMAL

CROSS REFERENCES TO RELATED APPLICATIONS

This application is a continuation-in-part of U.S. patent application Ser. No. 16/104,884 filed on Aug. 18, 2018, which is incorporated herein by reference.

U.S. patent application Ser. No. 16/104,884 was a continuation of U.S. patent application Ser. No. 14/879,886 filed on Oct. 9, 2015, now U.S. Pat. No. 10,051,840, which is incorporated herein by reference.

U.S. patent application Ser. No. 14/879,886 claimed the benefit of U.S. Provisional Patent Application No. 62/061,990 filed on Oct. 9, 2014 which is incorporated herein by reference.

FIELD

The present invention relates to an apparatus for restraining the lower legs of a livestock animal.

BACKGROUND

Typical livestock animal chutes for restraining livestock animals have included inward moving panels within a frame which squeeze the body of the livestock animal. An apparatus which squeezes the body of the animal still leaves the legs free for kicking. A large livestock animal that is kicking presents a serious hazard to those who are working with the animal. The applicant has discovered that all that is needed to immobilize a large livestock animal is to immobilize all four feet of the animal. If all four feet are secured, the livestock animal cannot move and the livestock animal cannot kick.

SUMMARY

The present livestock animal securing apparatus includes a chute which has a floor, an entryway and an exit as well as sidewalls which extend between the entrance and the exit. A set of longitudinal leg bars is situated near the floor of the chute between the entrance and the exit. The leg bars are moveably mounted for translation between a first retracted position in which the leg bars are spaced away from their respective adjacent sidewalls by a first distance suitable for allowing free movement of an animal's lower legs between the leg bars and the sidewalls and a second extended position in which the leg bars are spaced away from each of their adjacent sidewalls by as second distance that is smaller than the first distance, the second distance being such that the lower legs of a livestock animal are held securely between the leg bars and the sidewalls. Both the sidewalls and the leg bars are preferably padded with a suitable flexible material to prevent injury to the animal so restrained. When the lower legs of a livestock animal are securely held by the apparatus as described above, the animal is not able to kick or move from its secured position.

A second embodiment of a livestock animal leg restraining apparatus includes a chute having a floor and sidewalls, a center pad assembly and two side pad assemblies. The center pad assembly is mounted in a raised position above the center of the floor of the chute. The center pad assembly presents two opposite center pads that are oriented in the outboard direction. Two side pad assemblies are mounted to pivot panels that are able to pivot out from the sidewalls of the chute from an open position to a closed position. Each side pad assembly presents a side pad that is oriented in an inboard direction. When the pivot panels are tilted to the closed position, the side pads are brought into close proximity with the center pads so as to restrain the lower legs of a livestock animal.

DETAILED DESCRIPTION

Figure 1:
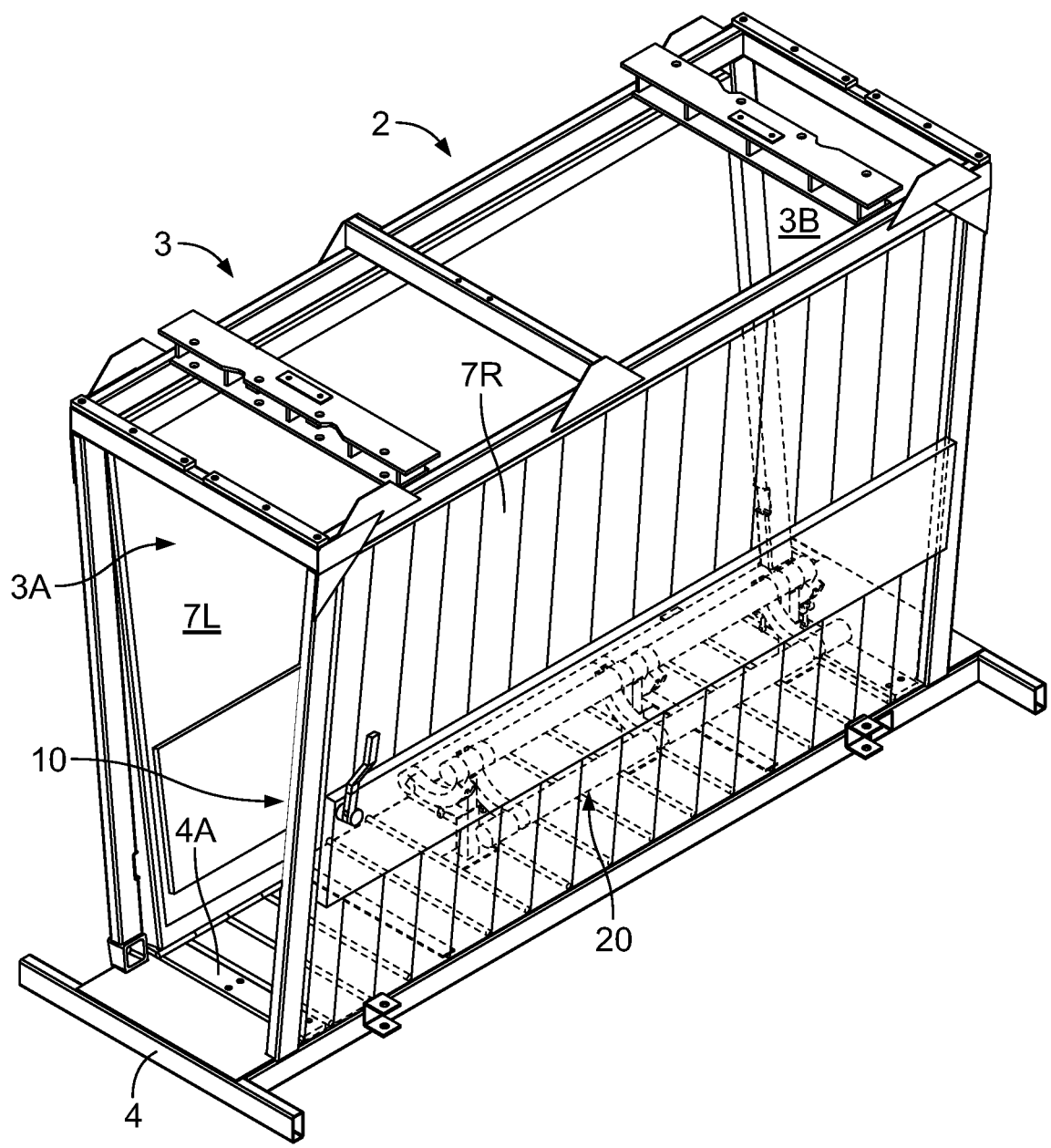
FIG. 1 is a perspective view of a chute with one embodiment of a lower leg restraining apparatus.

Referring to the drawings, FIG. 1 shows one embodiment of a leg restraining apparatus 10 which is incorporated into a livestock animal chute 2. Livestock animal chute 2 includes a frame 3 having a base 4. Base 4 presents a floor 4A which is suitable for being traversed by a livestock animal. Frame 3 is arranged to define an entrance 3A and an exit 3B. Opposing left and right sidewalls 7L and 7R extend between entrance 3A and the exit 3B thereby defining a chute suitable for the ingress and egress of a livestock animal. As can be seen in FIGS. 1-6, a leg securing mechanism 20 is mounted to floor 4A of base 4. As can be seen in FIGS. 1-6, in this example, leg securing mechanism 20 is located generally and preferable equidistantly between the left and right sidewalls 7L and 7R. In this example, leg securing mechanism 20 appears to be disposed closer to exit 3B than to entrance 3A and is shorter than animal chute 2. However, leg securing mechanism 20 may also extend nearly the full length of animal chute 2. The lower portions of left and right sidewalls 7L and 7R are preferably furnished with padded portions 7LP and 7RP which cooperate with leg securing mechanism 20 as will be described in greater detail below to provide leg restraining apparatus 10.

Figure 2A:
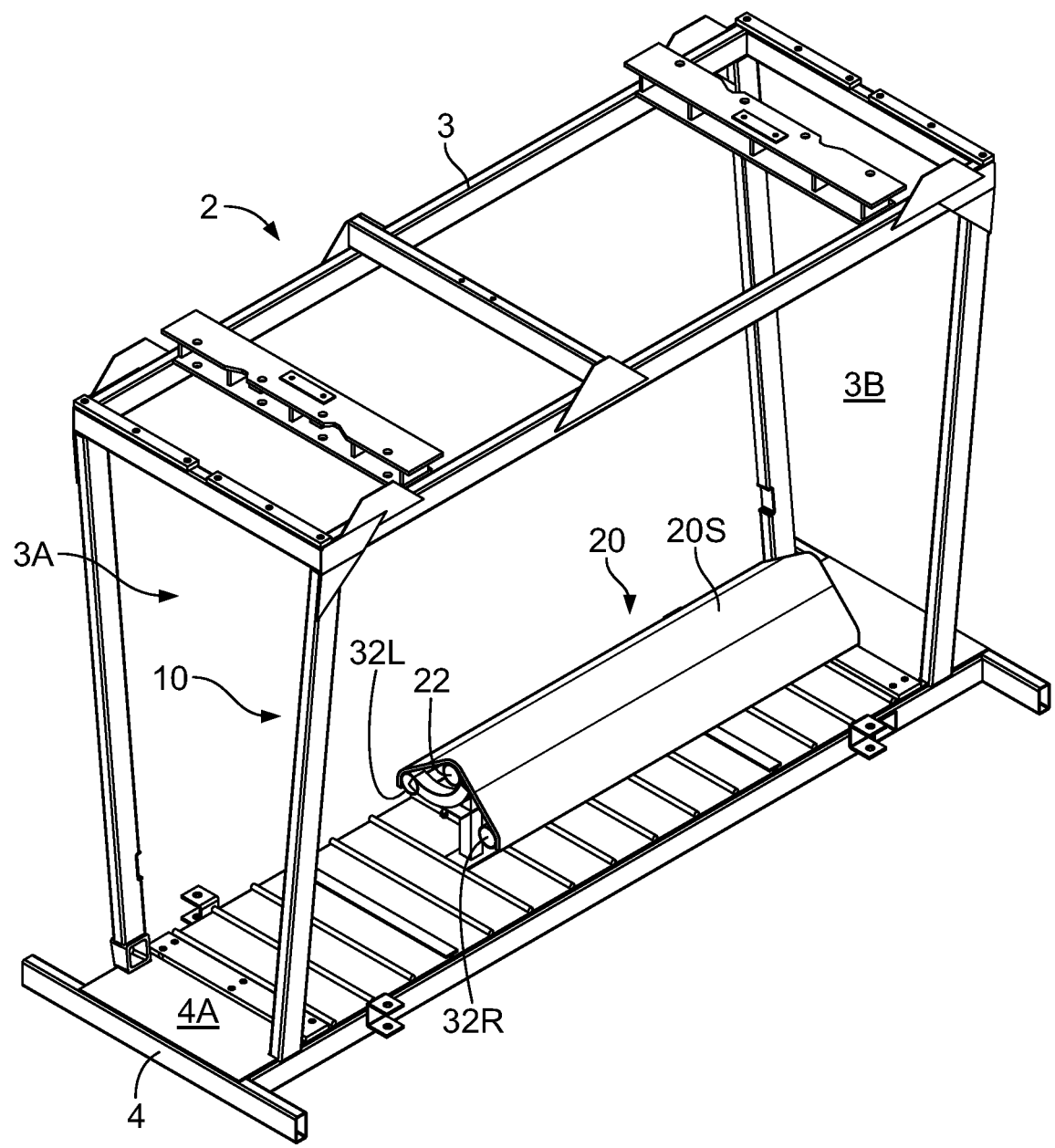
FIG. 2A is a second perspective view of a chute having one embodiment of a lower leg restraining apparatus with the sidewalls removed.
Figure 2B:
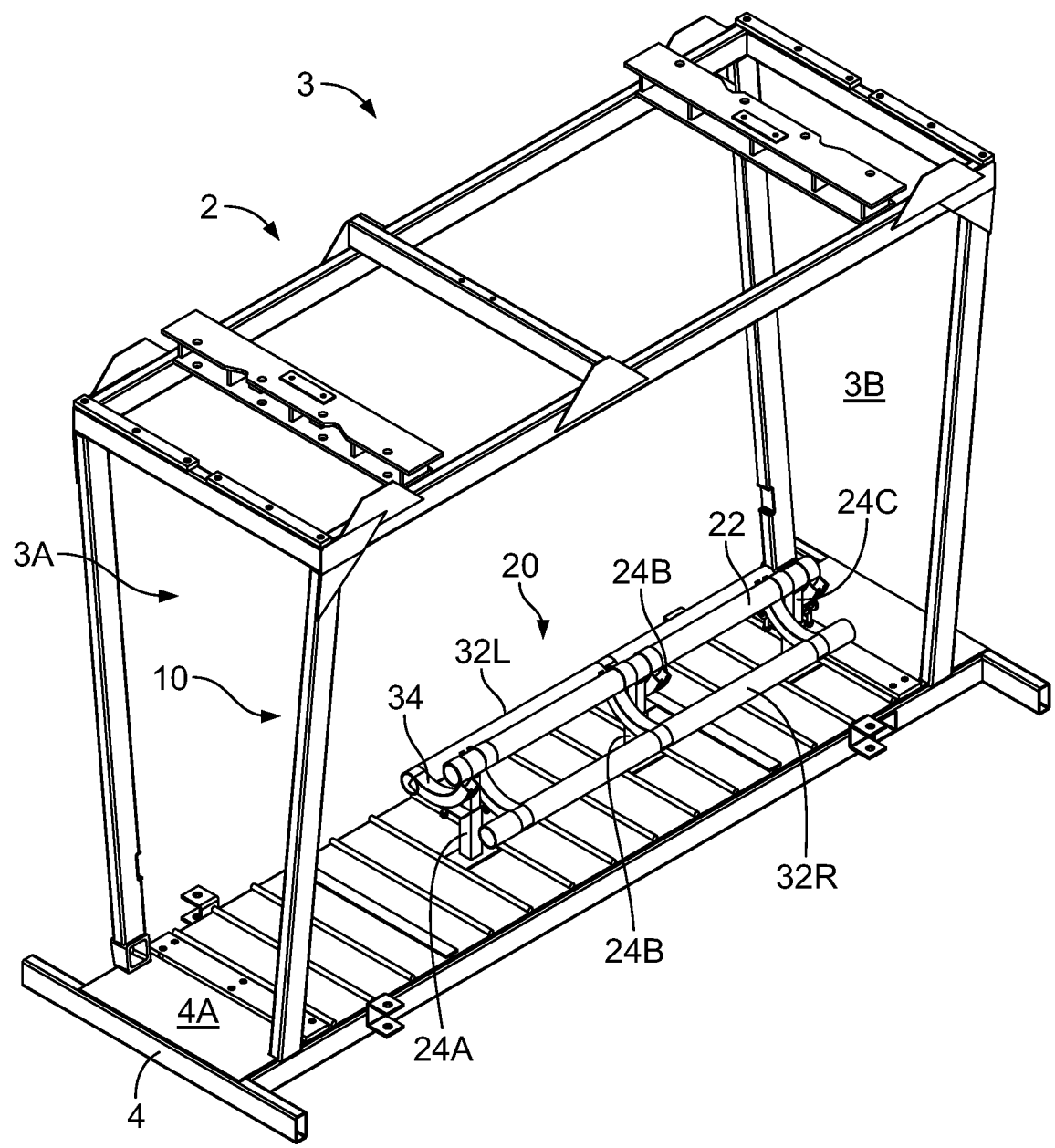
FIG. 2B is a second perspective view of the chute having one embodiment of a lower leg restraining apparatus as shown in FIG. 2A with the flexible covering removed from the leg restraining mechanism for clarity.
Figure 7:
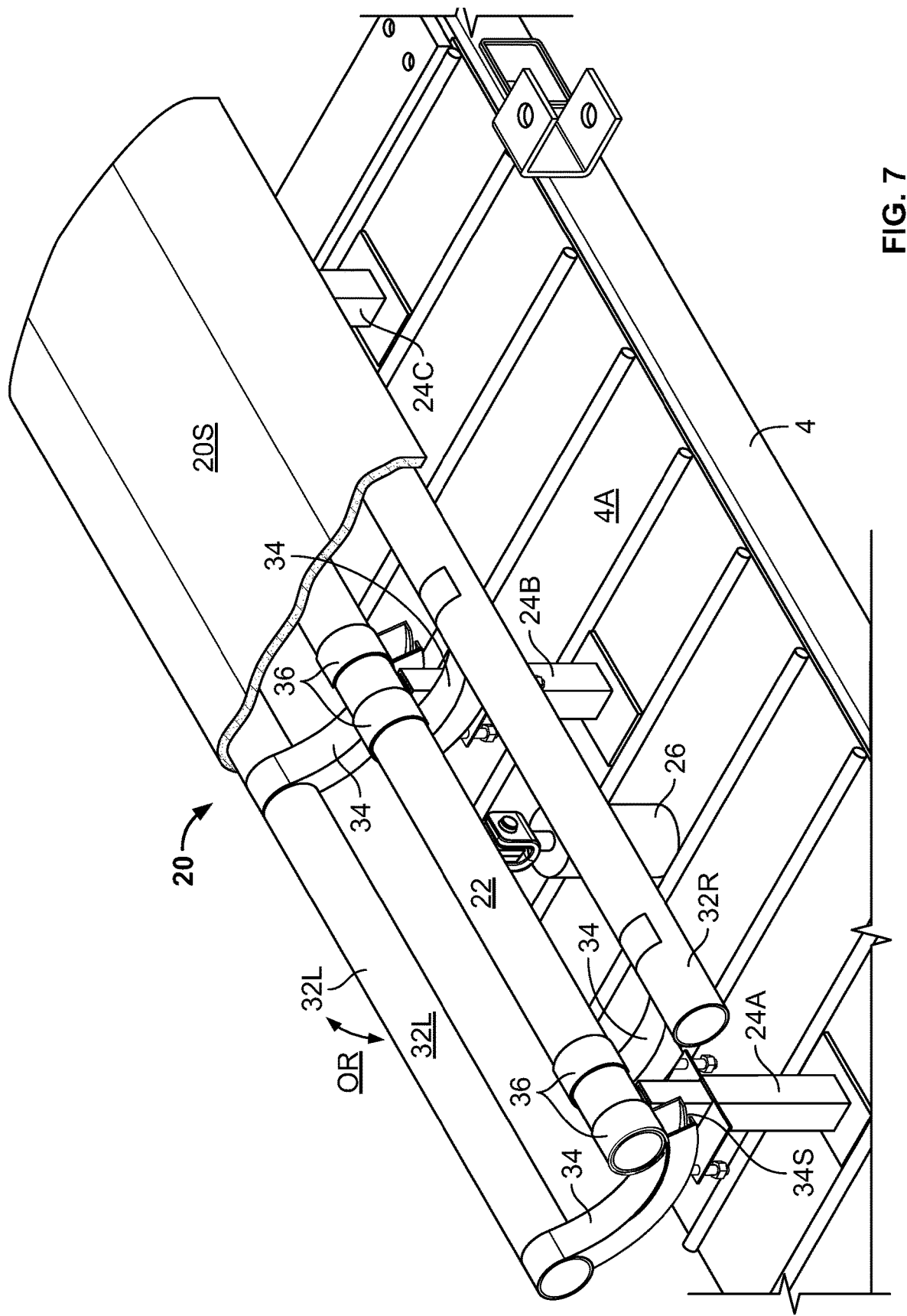
FIG. 7 is an enlarged perspective view of the leg restraining mechanism shown in the retracted position with the flexible cover removed for clarity.
Figure 8:
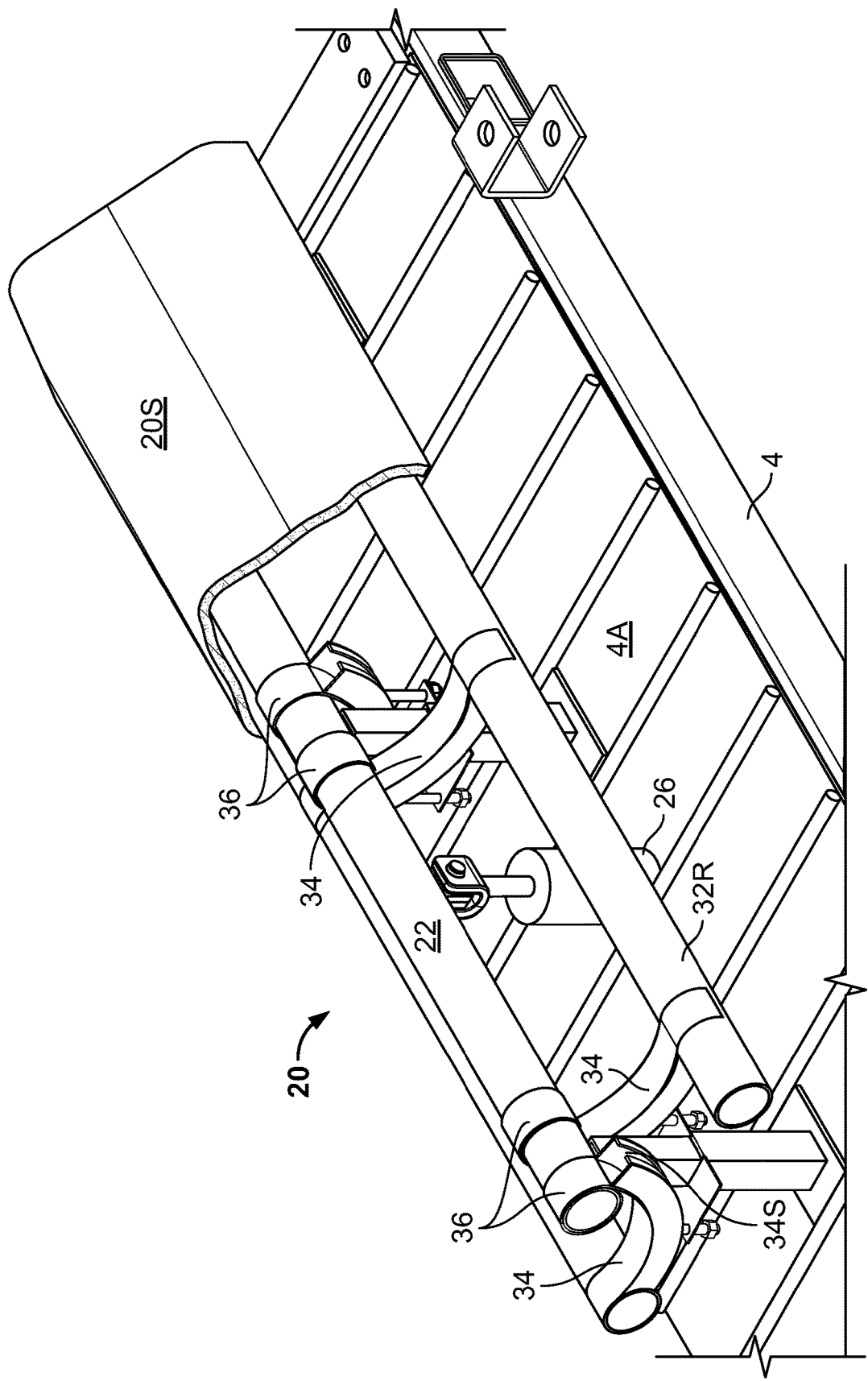
FIG. 8 is an enlarged perspective view of the leg restraining mechanism shown in the extended position with the flexible cover removed for clarity.

As can be seen in FIG. 2, leg securing mechanism 20 includes a support member 22 which is preferably positioned generally equidistantly between sidewalls 7L and 7R. In this example, support member 22 is a cylindrical pipe which preferably has a uniform outside diameter. As can be seen in FIG. 7, support member 22 is supported by a set of telescoping columns 24A, 24B and 24C. In this example, three telescoping columns are employed, but the skilled reader will appreciate that preferably at least two telescoping columns would be needed to adequately support support member 22. As can be best understood by referring to FIGS. 10 and 11, telescoping columns 24A, 24B and 24C are arranged to exclusively accommodate the vertical movement of support member 22 between a first raised position shown in FIG. 10 and a second lowered position shown in FIG. 11. As can be seen in FIGS. 7 and 8, an actuator 26 connects between base 4 of frame 3 and the support member. In this example actuator 26 is a hydraulic cylinder but actuator 26 may be any suitable actuator. The actuator is preferably controllable by an operator for moving support member 22 between the first raised position shown in FIG. 10 and second lowered position shown in FIG. 11.

As can also be seen in FIG. 2, leg securing mechanism 20 further also includes a left leg bar 32L and a right leg bar 32R. Left and right leg bars 32L and 32R are arranged on opposite sides of support member 22 and are each connected to support member 22 by a set of arms 34 which are preferably symmetrically identical and preferably interchangeable at least on each side of leg securing mechanism 20. As can be best seen in FIG. 8, in this example, each arm 34 has a generally square, hollow cross section and is formed in a curved or arc shape.

As can be best seen in FIGS. 7-11, the proximal end of each arm 34 is connected to support member 22 by a strap 36 which extends from the surface arm 34 which is adjacent to support member 22. In each case, strap 36 wraps around support member 22 and thereby forms a bushing around support member 22 which functions much like the portion of a hinge plate which is formed around a hinge pin. Accordingly, the proximal ends of arms 34 are rotatably connected to support member 22 to allow of arms 34 to rotate relative to support member 22 as shown in FIGS. 7-11. In this example, the distal ends of arms 34 are fixed to leg bars 32L and 32R as shown in FIGS. 7-11 so that leg bars 32L and 32R are able to move between a retracted position shown in FIG. 10 and an extended position shown in FIG. 11.

Leg securing mechanism 20 is arranged such that when support member 22 moves from the first raised positon to the second lowered positon, leg bars 32L and 32R translate outboard. Also, when leg bars 32L and 32R move outboard, they also move slightly upwardly along a curved path relative to floor 4A.

Figure 9:
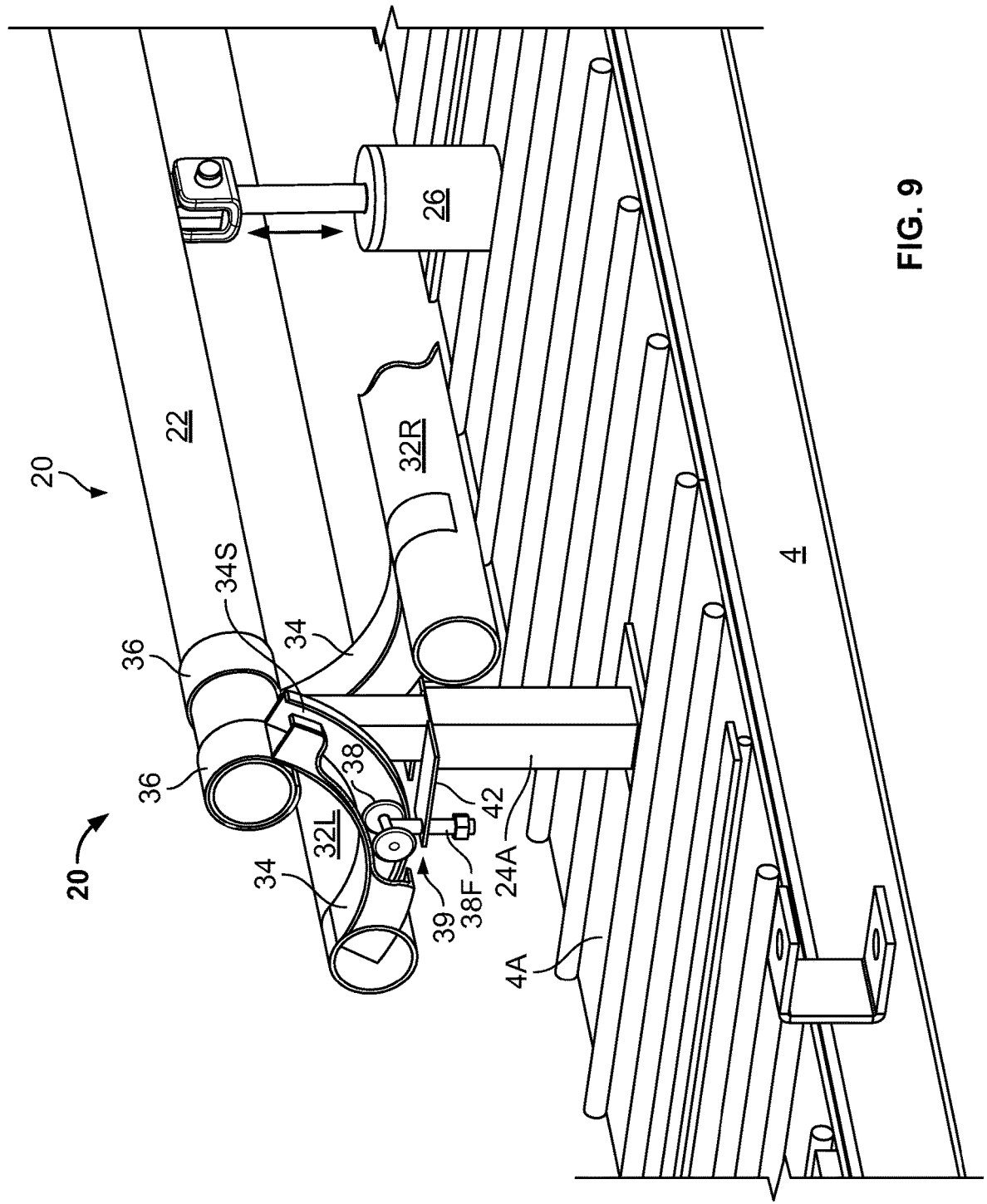
FIG. 9 is an enlarged perspective view of the leg restraining mechanism with the flexible cover removed for clarity and with one of the leg bars broken away to reveal an actuator and one of the arms extending between the central support member and one of the leg bars broken away to show the internal arrangement of the arm and the finger mounted roller which engages the arm.
Figure 10:
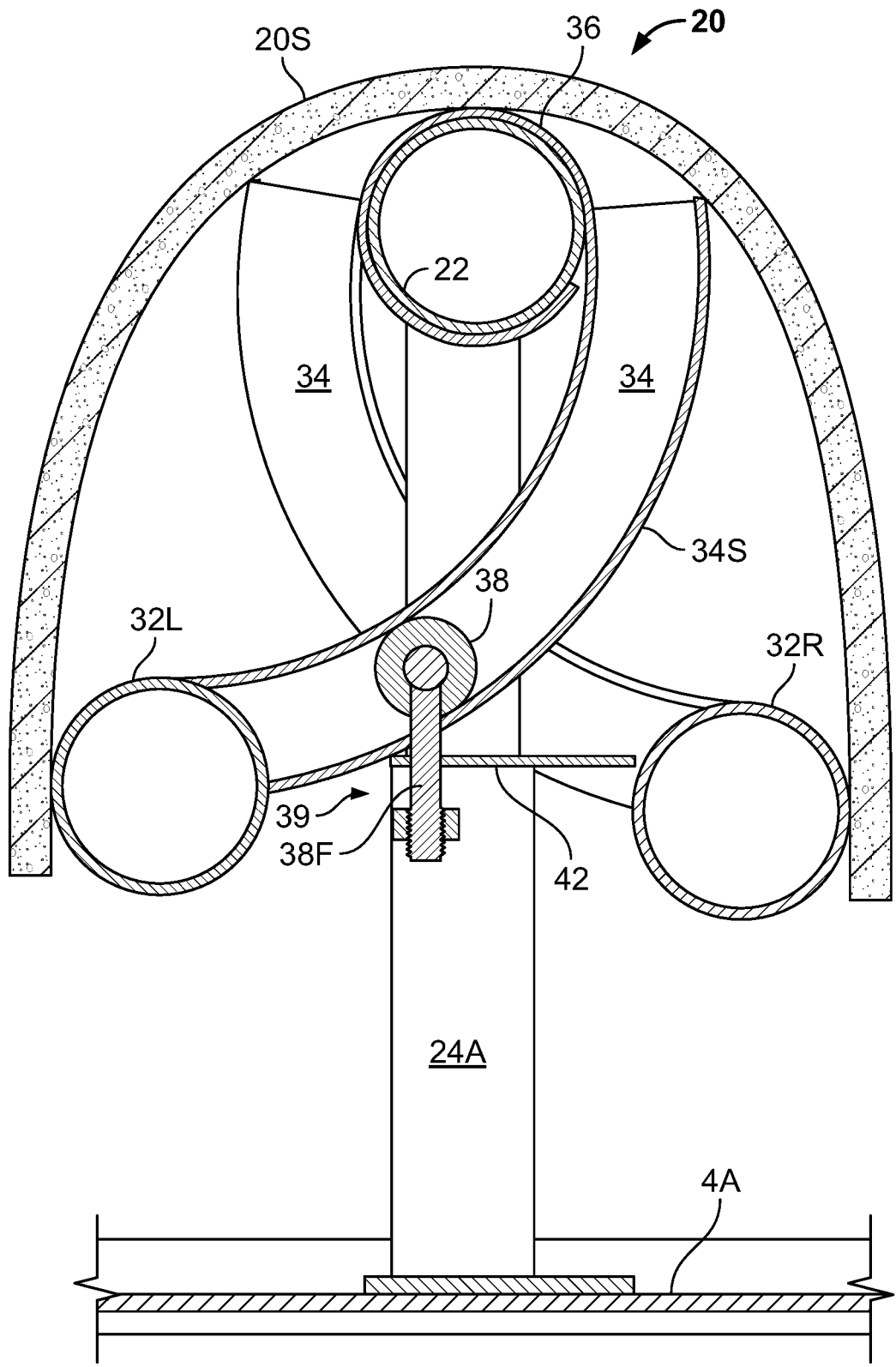
FIG. 10 is an enlarged end view of the leg restraining mechanism cut away to show the internal arrangement of one arm with the leg restraining mechanism in a fully retracted position.
Figure 11:
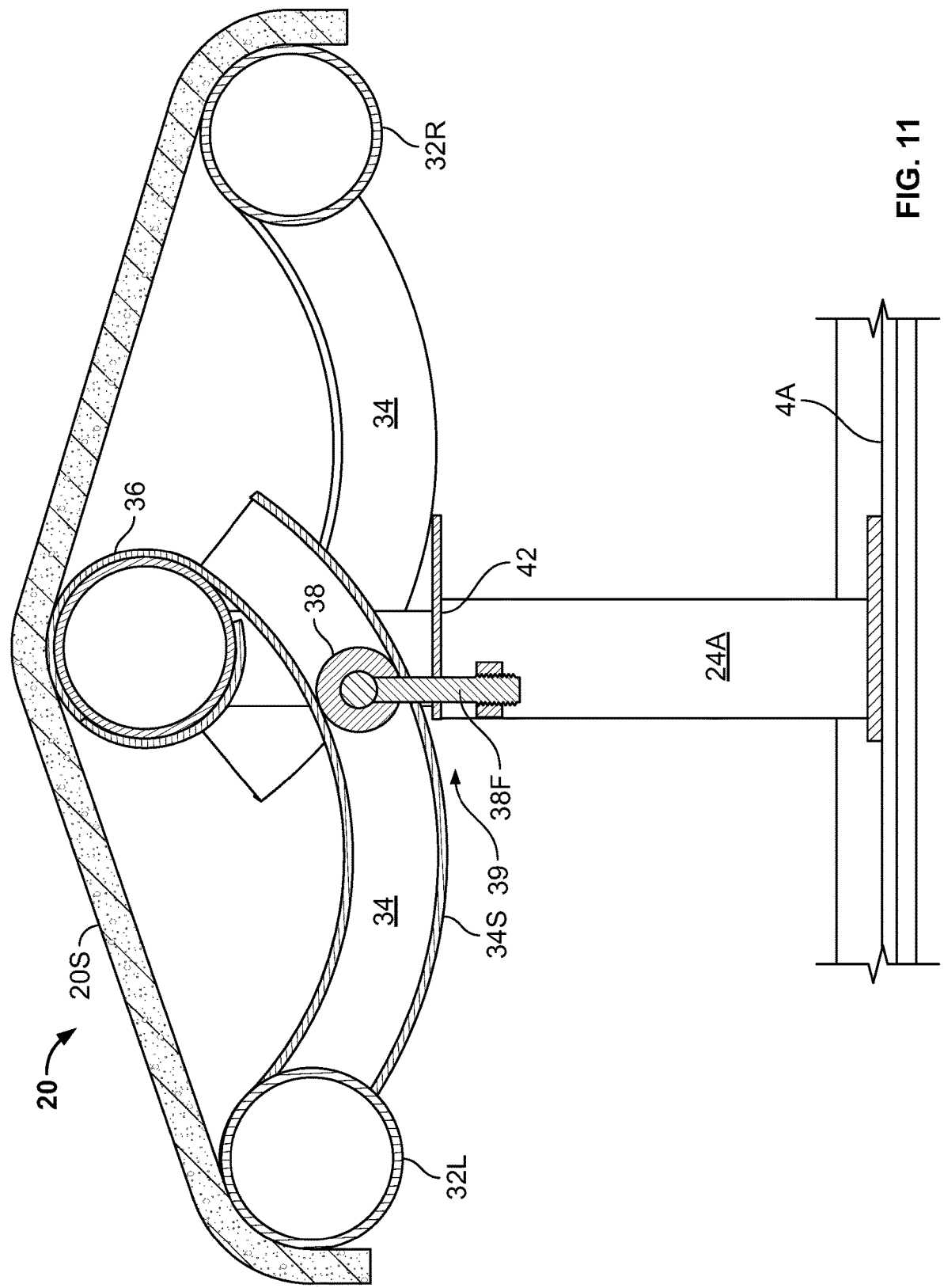
FIG. 11 is an enlarged end view of the leg restraining mechanism cut away to show the internal arrangement of one arm with the leg restraining mechanism in a fully extended position.

In this example, the outboard translation of leg bars 32L and 32R is constrained in a gently upwardly curving path because each arm 34 is translatably engaged by an element which is generally stationary with respect to frame 3. As noted above arms 34 are curved. In this example, each underside surface of each arm 34 presents a longitudinal slot 34S. As noted above, each arm 34 is hollow and in this example each arm 34 has a generally square cross section. Accordingly, as can be seen in FIGS. 9-11, each arm 34 is able to receive a roller 38 of a roller assembly 39. In each roller assembly 39, each roller 38 is rotatably mounted at the end of a finger 38F which is sized to be received by slot 34S. Each finger 38F, in turn, in this example, is fixed to a bracket 42 which, in turn, is fixed relative to floor 4A. Therefore, each roller assembly 39 (with the possible exception of rotating roller 38) is fixed relative to frame 3. In this example, the translatably engaging element is a roller assembly having a roller which is received within each arm, but the skilled reader will appreciate that any one of a number of engaging elements may be substituted for the roller arrangement described immediately above.

As can be best seen in FIGS. 10 and 11, the motions of arms 34 are constrained by roller assemblies 39 as leg securing mechanism 20 moves between the first retracted position shown in FIG. 10 and the second extended position shown in FIG. 11. And, because of the geometry of this mechanism including the curved shape of arms 34, in this example, the outboard path of each leg bar 32L and 32R describes a gently upwardly rising curved path. Preferably, leg restraining mechanism 20 is covered by a flexible covering 20S as shown in FIG. 2A. In this example, flexible covering 20S may be fashioned from belted rubber or a similar, comparable material. It is preferable that flexible covering 20S be arranged and secured to support member 22 and leg bars 32L and 32R such that it would not be possible for a livestock animal to place one of its legs between support member 22 and either of leg bars 32L or 32R.

Figure 5:
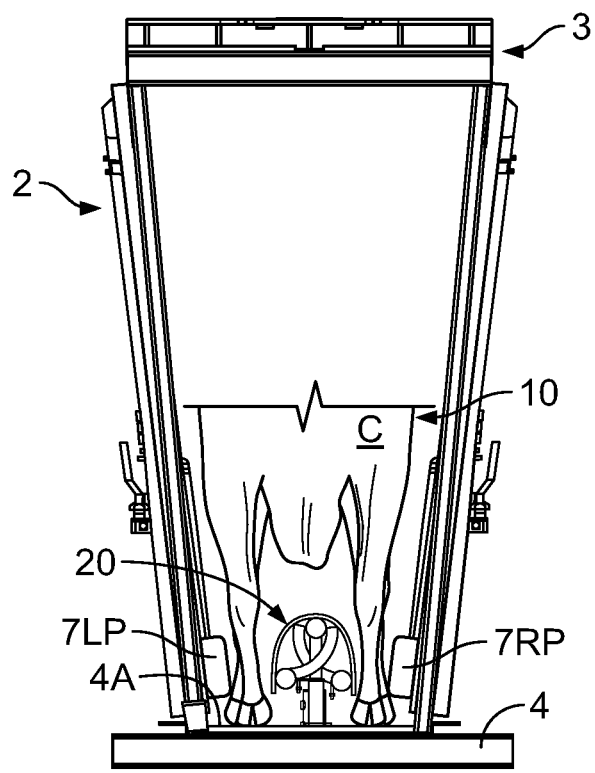
FIG. 5 is end view of one embodiment of a lower leg restraining apparatus shown with a leg restraining mechanism in the retracted position and also shown with a broken away lower portion of a livestock animal in order to illustrate that the lower legs of the livestock animal are able to freely between the leg restraining mechanism and the sidewalls of the chute.
Figure 6:
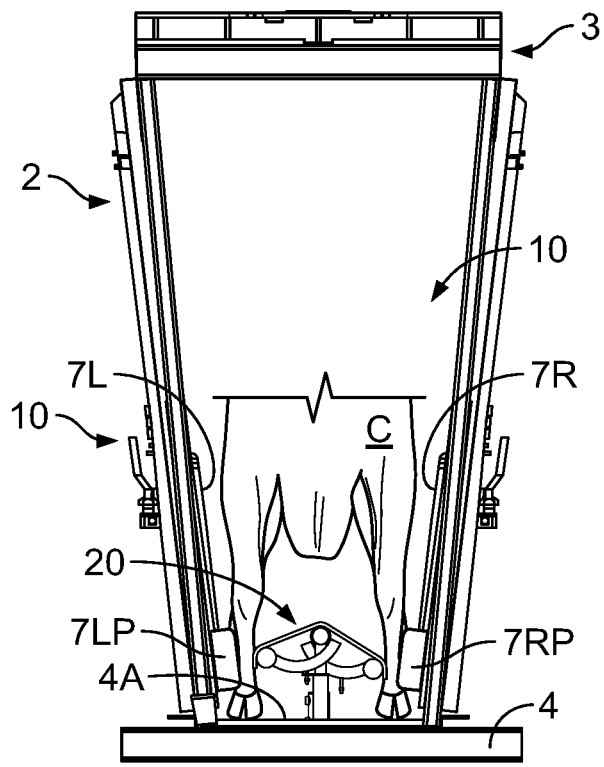
FIG. 6 is end view of a one embodiment of a lower leg restraining apparatus shown with a leg restraining mechanism in the extended position and also shown with a broken away lower portion of a livestock animal in order to illustrate that the lower legs of the livestock animal are secured between the leg restraining apparatus and the sidewalls such that the livestock animal is not able to move its legs.

As can be best seen in FIGS. 5 and 6, sidewalls 7A and 7B may present padded portions 7P1 and 7P2 which are generally positioned to be opposite from leg bars 32L and 32R respectively particularly when leg bars 32L and 32R are in the outboard position shown in FIG. 11. Thus, leg restraining mechanism 20 is preferably arranged so that the lower portions of a livestock animal's legs are pressed between padded padded portions 7P1 and 7P2 and flexible covering 20S which covers leg bars 32L and 32R. The objective is for restraining mechanism 20 to apply sufficient pressure to immobilize the legs of an animal C (indicated in FIGS. 5 and 6) without inflicting any significant injury to the legs of the animal C. A livestock animal thus immobilized is essentially incapable of kicking and even incapable of substantial bodily movements.

It is also preferable in this embodiment for sidewalls 7A and 7B to be mounted on movable panels which are able to be adjustably moved within frame 3. In this example, sidewalls 7A and 7B are able to be adjusted in unison in the outboard direction and inboard direction at their upper ends. Also in this example, sidewalls 7A and 7B are able to be adjusted in unison in the outboard direction and inboard direction at their lower ends. This makes it easier to accommodate different sizes of livestock animals.

Except for components which are more preferably fashioned from foam rubber, flexible belted rubber or injection molded plastic such as would be the case, for example, for padded portions 7P1 and 7P2, for flexible covering 20S or rollers 38, most of the components described above are preferably fashioned from high strength steel or some other appropriately strong, durable material. The general size of apparatus 10 would be determined by the general range of sizes found in a particular type of livestock animal. In most cases, apparatus 10 would be employed for working cattle but apparatus 10 could be adapted for use with other types of livestock animals.

As can be understood from the above description, apparatus 10 provides a useful article of equipment which is able to be used to secure and immobilizing the lower legs and feet of livestock animals thereby preventing kicking and also substantially immobilizing the livestock animal from other bodily movements.

Figure 12:
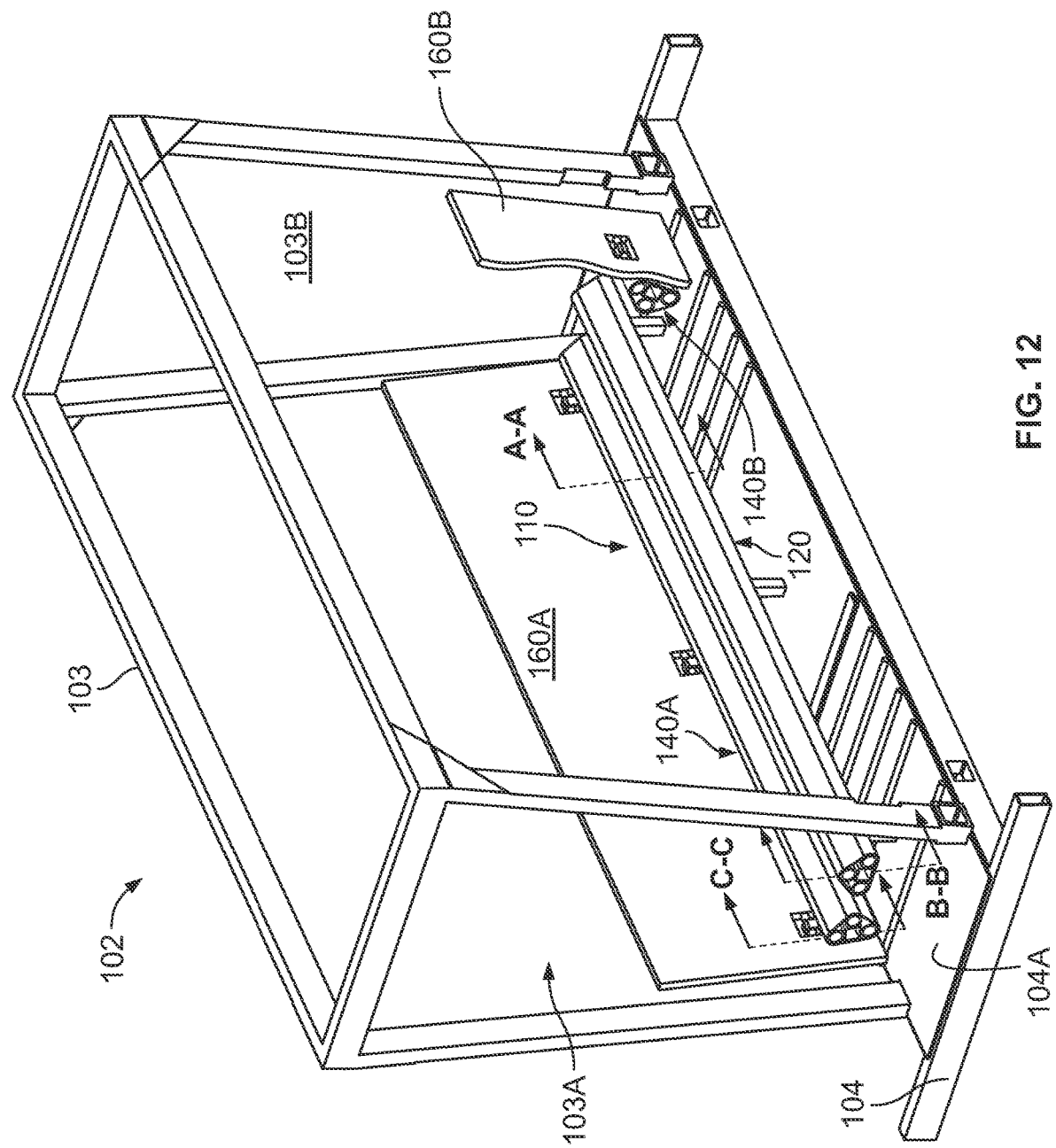
FIG. 12 is a perspective view of a chute with a second embodiment of a lower leg restraining apparatus.

Referring to the drawings, FIG. 12 shows a second embodiment of a leg restraining apparatus, namely leg restraining apparatus 110 which is incorporated into a livestock animal chute 102. Livestock animal chute 102 includes a frame 103 having a base 104. Base 104 presents a floor 104A which is suitable for being traversed by a livestock animal such as a cow, or a heifer or a steer. Frame 103 is arranged to define an entrance 103A and an exit 103B. Chute 102 may also support moving actuated side panels as part of a squeeze chute configuration for closing in on and restraining the upper body of the livestock animal. Such actuated side panels are shown and described in U.S. Pat. No. 6,425,351 but have been omitted here for clarity.

Figure 13:
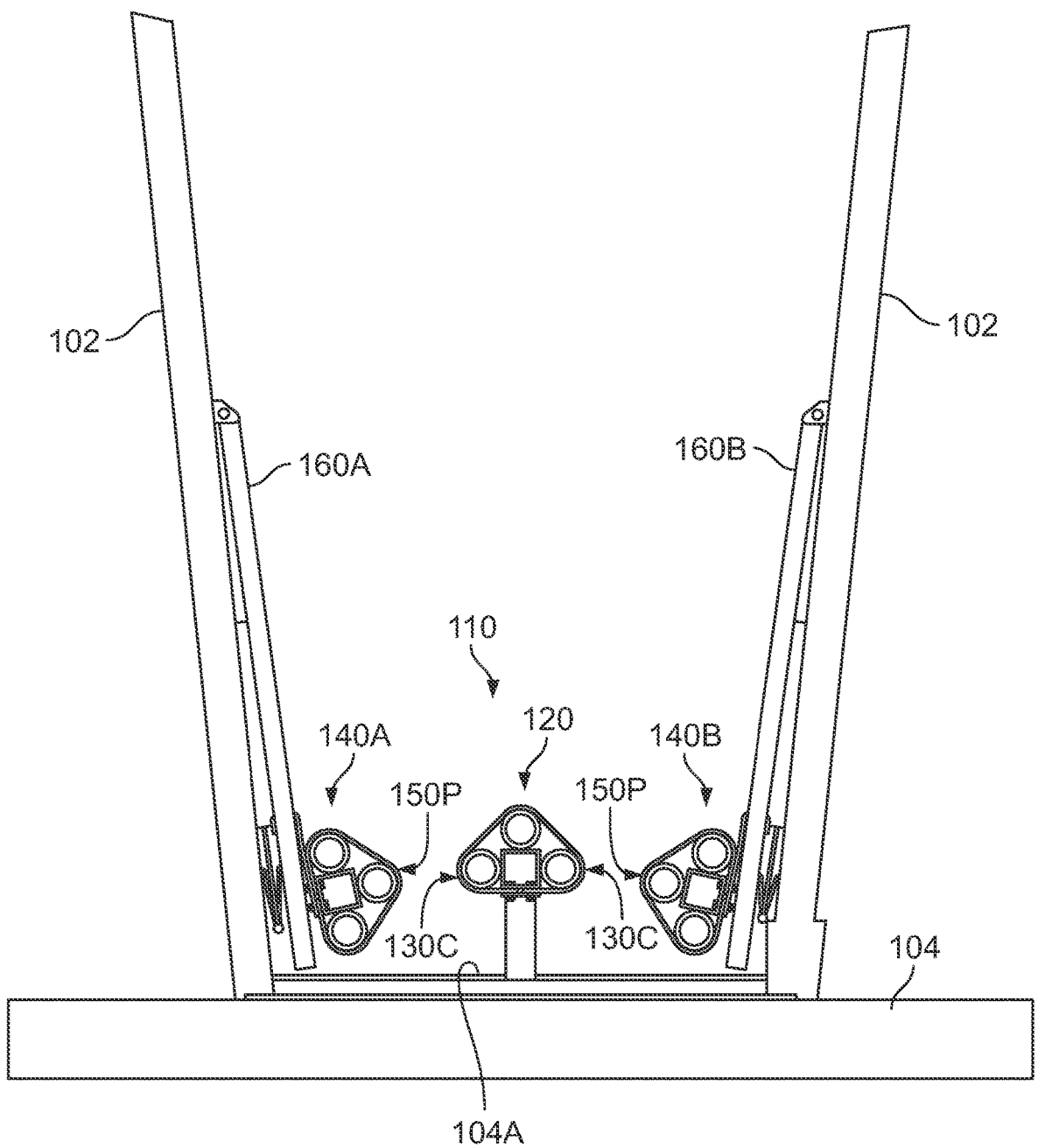
FIG. 13 is a partial end view of a chute with the second embodiment of the lower leg restraining apparatus shown in the open position.
Figure 14:
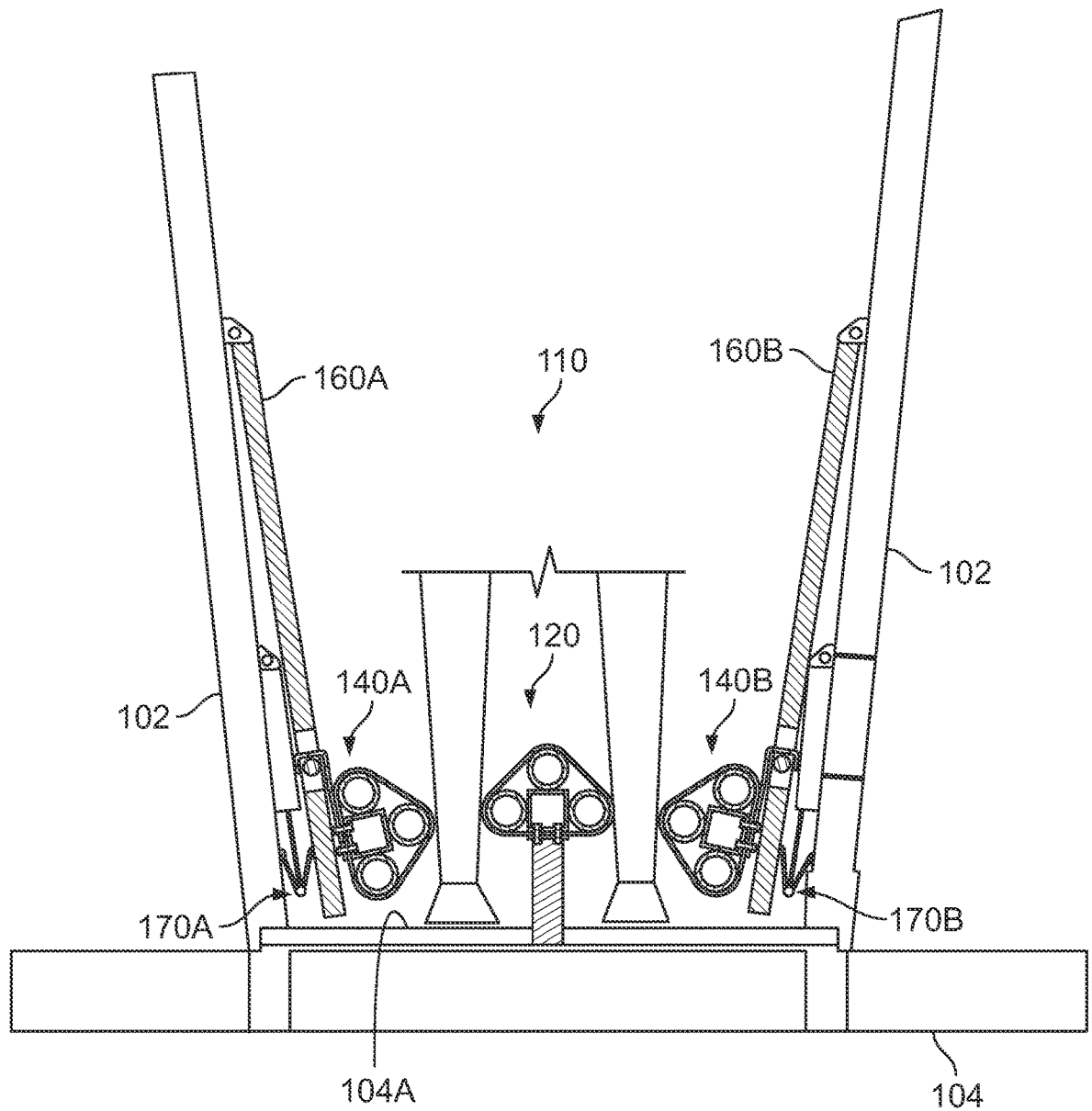
FIG. 14 is a partial end view of a chute with the second embodiment of a lower leg restraining apparatus shown in the closed position restraining the lower legs of a livestock animal.
Figure 15:
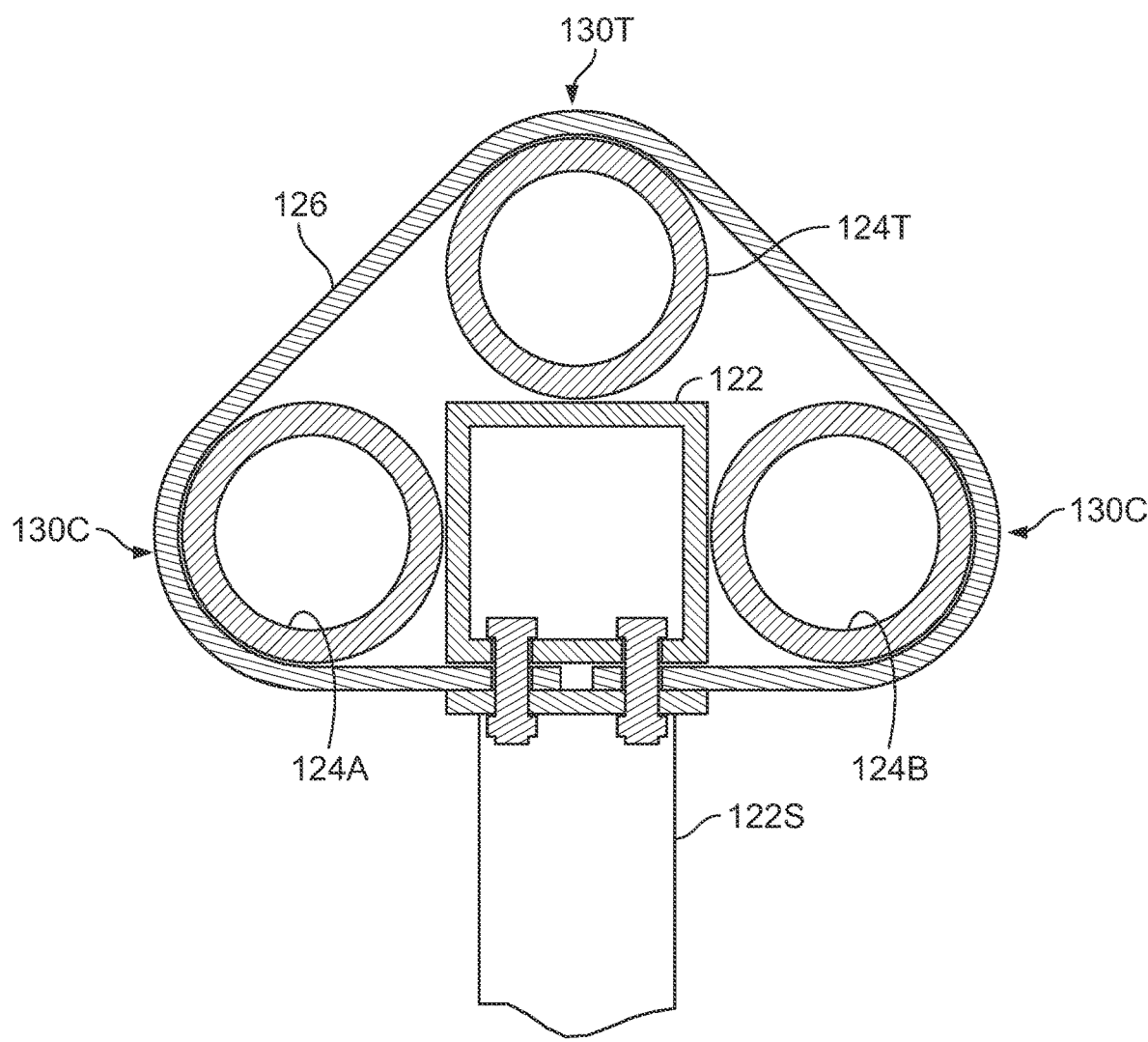
FIG. 15 is a cut away end view of a center pad assembly of the second embodiment of the lower leg restraining apparatus taken from plane A-A indicated in FIG. 12.

As can be seen in FIGS. 12-14, livestock animal leg securing apparatus includes a center pad assembly 120, a right side pad assembly 140A and a left side pad assembly 140B. As can be seen in FIGS. 13-15, center pad assembly 120 is mounted at the center of floor 104A and includes a center support member 122. Center support member 122 is supported above the floor by at least two spaced support columns 122S. It is preferable that canter support member 122 be elevated at between approximately six and eight inches above floor 104A and preferably immediately above the portion of the leg known as the "hock". It is also preferable that center support member 122 extends most of the length of chute 102. Two rubber tubes including a left rubber tube 124A and a right rubber tube 124B are fixed on the opposite outboard sides of center support member 122. A top rubber tube 124T is fixed on top of center support member 122. A sheet of rubber 126 is fixed to one side of the bottom surface of center support member 122 and wraps around rubber tubes 124A, 124T and 124B and is fixed to the opposite side of the bottom surface of the center support member 122. It is preferable that rubber tubes 124A, 124B and 124T be fashioned from rubber hose material. One possible option for the material for the rubber hoses described herein may be HOSECRAFT USA CM1 Single Ply Silicon Hose, part number, HOSE-CM1-1250-25 which is marketed by Hosecraft USA of Chicago, Illinois. An example material for rubber sheet 126 and other rubber sheets described herein might be the material that is used to make product number 33352980 for ¼" thick black rubber sheet which may be obtained from mscdirect.com.

Rubber tubes 124A, 124B and 124T and rubber sheet 126 cooperate to present a top center pad 130T on top of center support member 122 and opposite side center pads 130C on each side of center support member 122. Side center pads 130C are oriented in an outboard direction. Center pads 130T and 130C preferably extend the length of support member 122.

Figure 16:
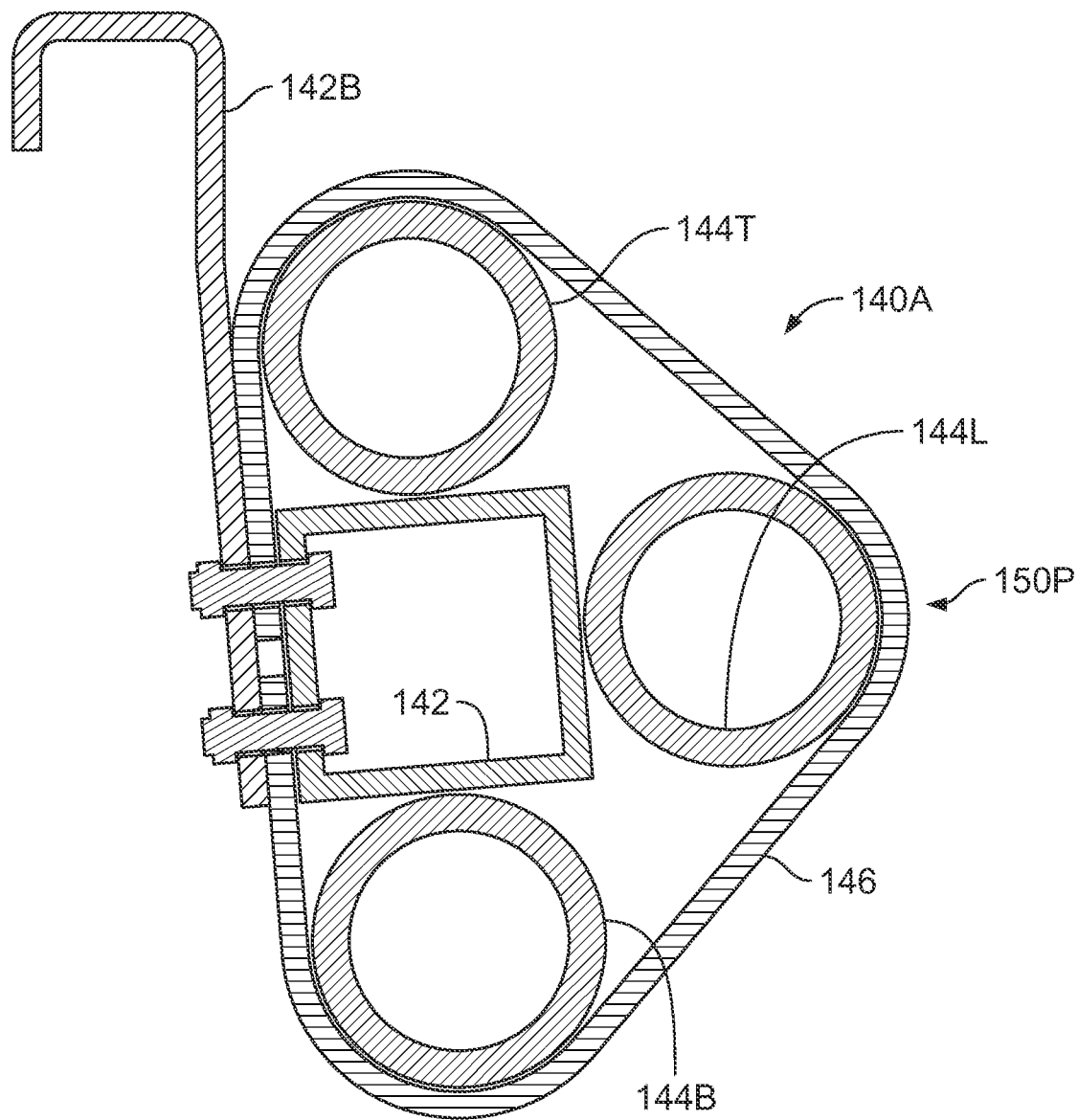
FIG. 16 is a cut away end view of a side pad assembly of the second embodiment of the lower leg restraining apparatus taken from plane B-B indicated in FIG. 12.

As can be seen in FIGS. 13, 14, 17 and 18, each side wall of chute 102 includes a pivoting panel 160A and 160B that is able to be actuated to pivot about a longitudinal axis that is spaced above the floor of the chute for pivoting movement between an open position as shown in FIG. 13 and a closed position as shown in FIG. 14. Each side pad assembly 140A and 140B is mounted to one of the pivoting panels 160A and 160B respectively. For clarity, we will consider side pad assembly 140A while considering that side pad assembly 140B is a symmetrical, generally identical opposite of side pad assembly 140A. As is shown in FIG. 16, side pad assembly 140A includes a rigid side member 142 that, in this embodiment has a square cross section. A top rubber tube 144T is fixed to the top surface of side member 142 and a bottom rubber tube 144B is fixed to the opposite bottom side of side member 142. An inboard rubber tube 144L is fixed to the inboard surface of side member 142. A sheet of rubber 146 is fixed to the upper portion of the outboard side of side member 142 and is wrapped around all three rubber tubes and is fixed to the bottom portion of the outboard side of side member 142. Rubber tubes 144T, 144B and 144L and rubber sheet 146 cooperate to present a side pad 150P that is oriented in an inboard direction. Side pad 150P preferably extends the length of side member 142. As is shown in FIG. 5, side pad assembly 140A also includes a bracket 142B which is adapted to hook on to a corresponding feature that is presented by pivoting panel 160A.

Figure 3:
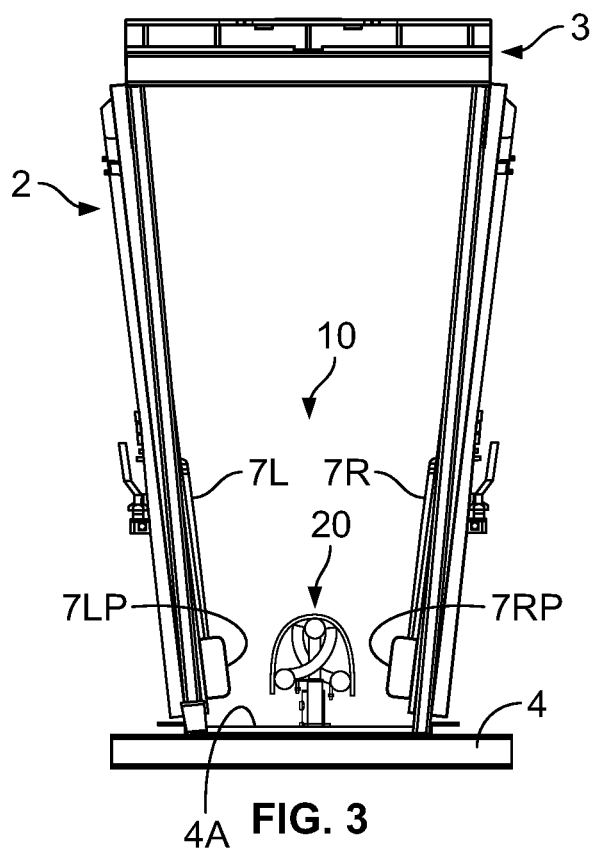
FIG. 3 is end view of one embodiment of a lower leg restraining apparatus shown with a leg restraining mechanism in a retracted position.
Figure 4:
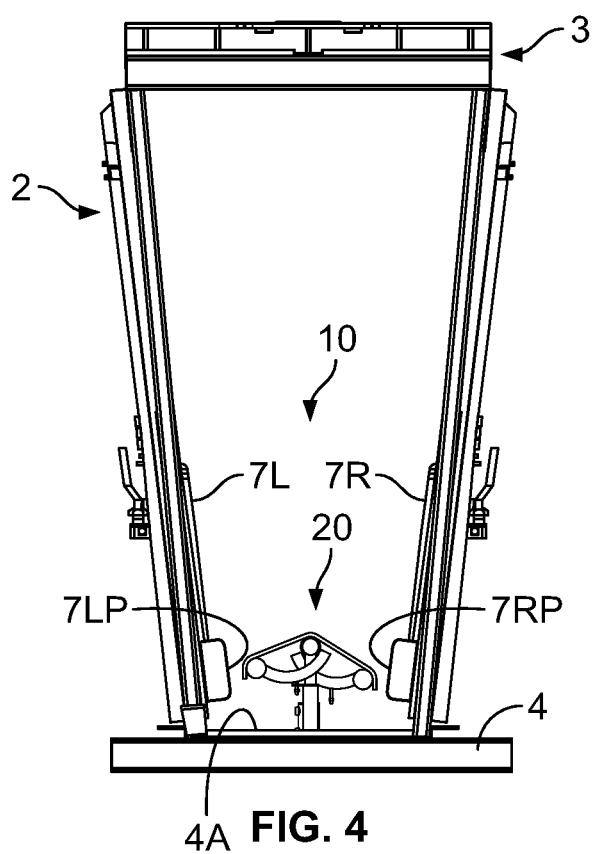
FIG. 4 is end view of one embodiment of a lower leg restraining apparatus shown with a leg restraining mechanism in an extended position.

Side pad assemblies 140A and 140B and center pad assembly 120 are arranged so that when pivoting panels 160A and 160B are pivoted from the open position shown in FIG. 13 to the closed position shown in FIG. 14, side pads 150P come into close proximity with the corresponding center pads 130C. The elevation of side pads 150P and the center pads 130C above floor 140A of chute 102 when they are in close proximity is arranged to coincide with each other and coincide with a portion of the lower legs of cattle that is above the hooves and ankles as is shown in FIG. 3. Because the rubber tubes and the sheet material are resilient and flexible, the lower legs shown in FIG. 3 are squeezed in a relatively gentle manner with sufficient force to allow some movement but to prevent extraction of hooves and kicking.

Figure 17:
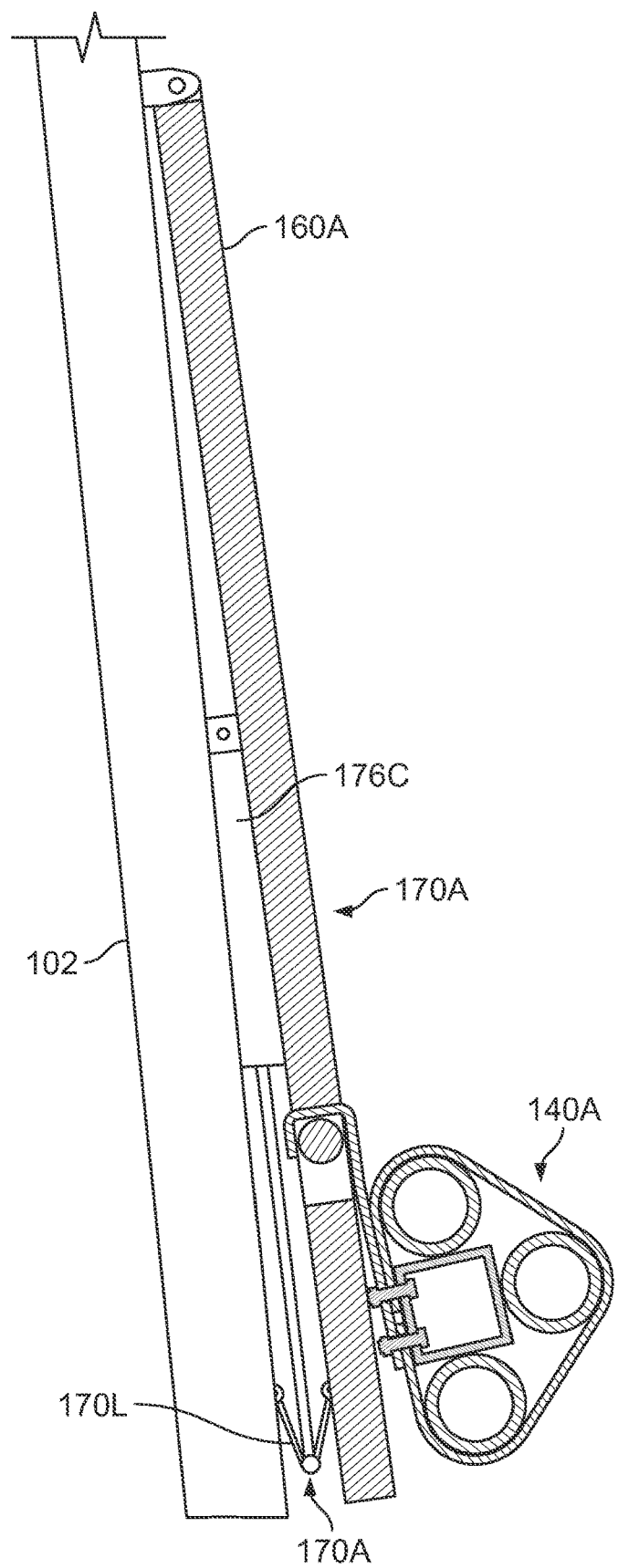
FIG. 17 is an end view taken from plane C-C indicated in FIG. 12 showing an actuator mechanism for moving a side panel between an open position and a closed position showing the side pad assembly for the leg restraining apparatus in the open position.
Figure 18:
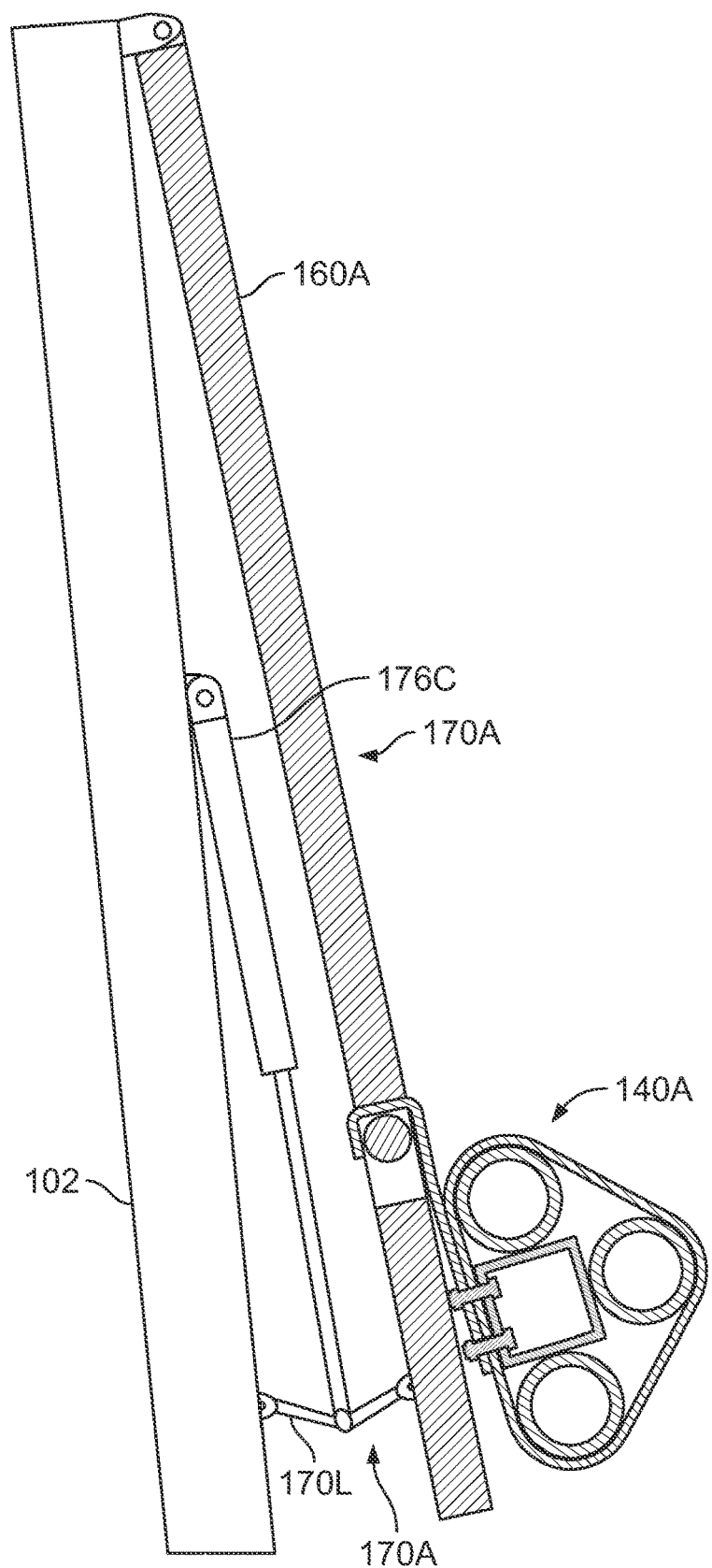
FIG. 18 is an end view taken from plane C-C indicated in FIG. 12 showing an actuator mechanism for moving a side panel between an open position and a closed position, but unlike as shown in FIGS. 1 and 2, and as shown in FIG. 3, showing the side pad assembly for the lower leg restraining apparatus in the closed position.

FIGS. 17 and 18 illustrate one embodiment of an actuator mechanism that may be employed for moving pivoting panel 160A between the open position shown in FIGS. 2 and 6 and the closed position shown in FIGS. 3 and 7. As can be seen in this example and in FIG. 18, a two-bar linkage 170A, which includes two links 170L, extends between pivoting panel 160A and a member of frame 103 of chute 102. An actuator 176C extends between the member of the frame of chute 102 to a point that is near or at the center of the two two-bar linkage 170A. Accordingly, when actuator 176C extends, pivoting panel 160A rotates to the open position shown in FIGS. 13 and 17 and when actuator 176C contracts, pivoting panel 160A rotates to the closed position shown in FIGS. 14 and 18. The same pivoting action would occur, preferably simultaneously, on the opposite side of leg restraining apparatus 110, for pivoting panel 160B and with an opposite two-bar linkage 170B which is shown in FIG. 14.

As can be understood from the above description, leg restraining apparatus 110 is arranged so that when it is in the open position as shown in FIG. 13, the hooves of the livestock animal are directed between side pad assemblies 140A and 140B and center pad assembly 120 as the animal walks into chute 102. Once the animal is positioned with its lower legs between pad assemblies 140A and 140B and center pad assembly 120, leg restraining apparatus 110 may be moved to the closed position as shown in FIG. 14. In this embodiment, the combination of the rubber tubes and the rubber sheeting provide soft, resilient members for grasping the lower legs of the animal. The animal is restrained from kicking but it is not harmed. When leg restraining apparatus 110 is returned to the open position shown in FIG. 13, the animal is free to move its hooves and lower legs and exit chute 102.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A livestock animal leg restraining apparatus, comprising:
    a livestock chute having a floor and sidewalls, the livestock chute being oriented in a longitudinal direction, the sidewalls further spaced apart to define an entrance suitable for livestock animal to enter the livestock chute at a first end of the livestock chute and an exit suitable for egress of a livestock animal at the other opposite end of the livestock chute,
    a center pad assembly that is elongated, mounted to the floor of the livestock chute and centered between the sidewalls of the livestock chute, the center pad assembly being mounted in a raised position above the center of the floor of the livestock chute, the center pad assembly presenting two opposite center pads that are oriented in the outboard direction and being located at an elevation that corresponds to the lower end of the legs of the livestock animal which is substantially closer to the hoofs of the livestock animal than to the knee joints of the livestock animal,
    two opposite pivot panel assemblies that are each pivotably mounted to one of the sidewalls of the livestock chute, each pivot panel being able to pivot about an axis that is aligned with the longitudinal direction of the livestock chute and which is spaced away from the floor of the livestock chute, each side panel having an inwardly oriented side pad that is elongated and arranged along the lower margin of each side panel, each side pad having a length that corresponds to the lengths of the center pads and the side pads being situated at an elevation that corresponds to the elevation of the center pads, the center pads and the side pads being arranged in a longitudinal fashion and such that the side pads and the center pads are arranged to be parallel to each other and,
    at least two actuators including at least one actuator connecting between each of the side panels of the livestock chute and each of the pivot panels, each of the at least two actuators being arranged to be able to pivot the pivot panels in unison between a first open position in which each side pad is spaced away from and parallel the most proximate center pad of the center pad assembly and a second closed position in which each side pad is in close proximity and parallel to the most proximate center pad of the center pad assembly, whereby a livestock animal is able to walk into the livestock chute when the side panels are in the first open position such that the side pads are spaced away from the center pads and whereby the lower legs of the livestock animal are secured between the center pads and the side pads when the side panels are pivoted by the actuators into the second closed position such that the side pads are in close proximity to the center pads of the center pad assembly and such that the lower legs of the livestock animal are secured at locations that are above the hooves and below the knees of the livestock animal and in closer proximity to the hooves than to the knees.

* * * * *